US012598160B2

(12) United States Patent
Sanders

(10) Patent No.: US 12,598,160 B2
(45) Date of Patent: Apr. 7, 2026

(54) PROXY SERVER WITH DYNAMIC MEMORY BUFFER

(71) Applicant: LIGHTSPEED SOLUTIONS, LLC, Austin, TX (US)

(72) Inventor: Kevin Sanders, Austin, TX (US)

(73) Assignee: Lightspeed Solutions, LLC, Austin, TX (US)

( * ) Notice: Subject to any disclaimer, the term of this patent is extended or adjusted under 35 U.S.C. 154(b) by 256 days.

(21) Appl. No.: 18/145,099

(22) Filed: Dec. 22, 2022

(65) Prior Publication Data

US 2024/0214355 A1 Jun. 27, 2024

(51) Int. Cl.
*H04L 9/40* (2022.01)
*H04L 67/025* (2022.01)

(52) U.S. Cl.
CPC ...... *H04L 63/0281* (2013.01); *H04L 63/0236* (2013.01); *H04L 67/025* (2013.01)

(58) Field of Classification Search
CPC ..... H04L 67/025; H04L 67/565; H04L 67/02; H04L 67/10; H04L 63/10; H04L 9/40; H04L 63/0245; H04L 63/102; H04L 63/08; H04L 65/80; H04L 43/08; H04L 65/61; H04L 67/60; H04L 65/65; H04L 65/764; G06F 16/9535; G06F 21/6218; G06F 21/31; G06F 3/1446; G06F 16/951; G09G 5/391; G06Q 30/0241; G06Q 30/0277
See application file for complete search history.

(56) References Cited

U.S. PATENT DOCUMENTS

| | | | | |
|---|---|---|---|---|
| 8,224,950 B2 * | 7/2012 | Humes | ............... | G06F 16/9535 |
| | | | | 709/224 |
| 9,154,479 B1 | 10/2015 | Sethi | | |
| 9,667,603 B2 | 5/2017 | Sandoval et al. | | |

(Continued)

FOREIGN PATENT DOCUMENTS

| | | | | | |
|---|---|---|---|---|---|
| JP | | H05108565 A | * | 4/1993 | |
| WO | WO 2002/084512 | | | 10/2002 | |
| WO | WO-2014096463 A1 | * | 6/2014 | ............. | H04L 65/80 |

OTHER PUBLICATIONS

Akbas, E., "Next Generation Filtering: Offline Filtering Enhanced Proxy Architecture for Web Content Filtering", IEEE, pp. 1-4, 2008.

(Continued)

*Primary Examiner* — Kyung H Shin
(74) *Attorney, Agent, or Firm* — Norton Rose Fulbright US LLP

(57) ABSTRACT

Aspects of this disclosure improve modification of requested web content by utilizing an expanded memory buffer of a proxy server. A method may include receiving, by a proxy, web content requested by an application of a user device; initializing, by the proxy, a memory buffer of a first size to store a header of the web content; determining, by the proxy, a set of filtering rules associated with the user of the user device; determining, by the proxy, modified web content in accordance with the set of filtering rules, wherein the determining comprises, when the filtering rules specify modification of body content of the web content, performing operations comprising: expanding the memory buffer to a second size larger than the first size. Other aspects are also disclosed.

17 Claims, 6 Drawing Sheets

(56) References Cited

U.S. PATENT DOCUMENTS

| | | | | |
|---|---|---|---|---|
| 10,284,526 | B2 | 5/2019 | Moore | |
| 10,749,926 | B2 * | 8/2020 | Whitt | H04L 67/025 |
| 2009/0178061 | A1 | 7/2009 | Sandoval et al. | |
| 2010/0153544 | A1 | 6/2010 | Krassner et al. | |
| 2010/0164970 | A1 * | 7/2010 | Lyons | G06F 3/1446 |
| | | | | 345/545 |
| 2014/0115661 | A1 * | 4/2014 | Nah | G06F 21/6218 |
| | | | | 726/2 |
| 2014/0215050 | A1 | 7/2014 | Lu | |
| 2014/0337147 | A1 * | 11/2014 | DaSilva | G06Q 30/0241 |
| | | | | 705/14.73 |
| 2014/0337918 | A1 | 11/2014 | Siddiqi et al. | |
| 2014/0351573 | A1 | 11/2014 | Martini | |
| 2016/0119284 | A1 | 4/2016 | Kim | |
| 2016/0285832 | A1 | 9/2016 | Petrov et al. | |
| 2016/0330230 | A1 | 11/2016 | Reddy et al. | |
| 2017/0237766 | A1 | 8/2017 | Mattson et al. | |
| 2018/0012256 | A1 | 1/2018 | Napchi et al. | |
| 2019/0288985 | A1 | 9/2019 | Chambers et al. | |
| 2019/0327338 | A1 | 10/2019 | Meadors et al. | |

OTHER PUBLICATIONS

Anonymous: "Google Analytics—Wikipedia", Feb. 22, 2018, XP055621150, Retrieved from the Internet: URL: https://en.wikipedia.org/w/index.php?title=GoogleAnalytics&oldid=827025596.

Durieux, T. et al., "Fully Automated HTML and Javascript Rewriting for Constructing a Self-healing Web Proxy", arxiv.org, Cornell University Library, Mar. 23, 2018.

Henkel, Z., "ISP Advertisement Injection—CMA Communications" Mar. 29, 2013, XP055597666, Retrieved from the Internet: URL: https://zmhenkel.blogspot.com/2013/03/isp-advertisement-injeciton-cma.html.

Hruska, F. "Nginx reverse proxy with code injection—FHR's Blog", Sep. 20, 2017, XP055620406, Retrieved from the Internet: URL: https://blog.fhrnet.eu/2017/09/20/nginx-reverse-proxy-with-code-injection/.

Malhotra, P., "Injecting Javascript in HTML Content Using MITM Proxy", Jun. 8, 2015, XP055597689, Retrieved from the Internet: URL: http://pankajmalhotra.com/injecting-javascript-in-HTML-Content-Using-MITM-Proxy.

Tsirantonakis et al., "A Large-scale Analysis of Content Modification by Open HTTP Proxies", Proceedings 2018 Network and Distributed System Security Symposium, Feb. 18, 2018, XP055620768, Reston, VA.

Yakushev, R., "Using Outbound Rules to add Web Analytics tracking code: Microsoft Docs", Jul. 16, 2009, XP055621154, Retrieved from the Internet: URL: http://docs.microsoft.com/en-us/lis/extensions/url-rewrite-module/using-outbound-rules-to-add-web-analytics-tracking-code.

* cited by examiner

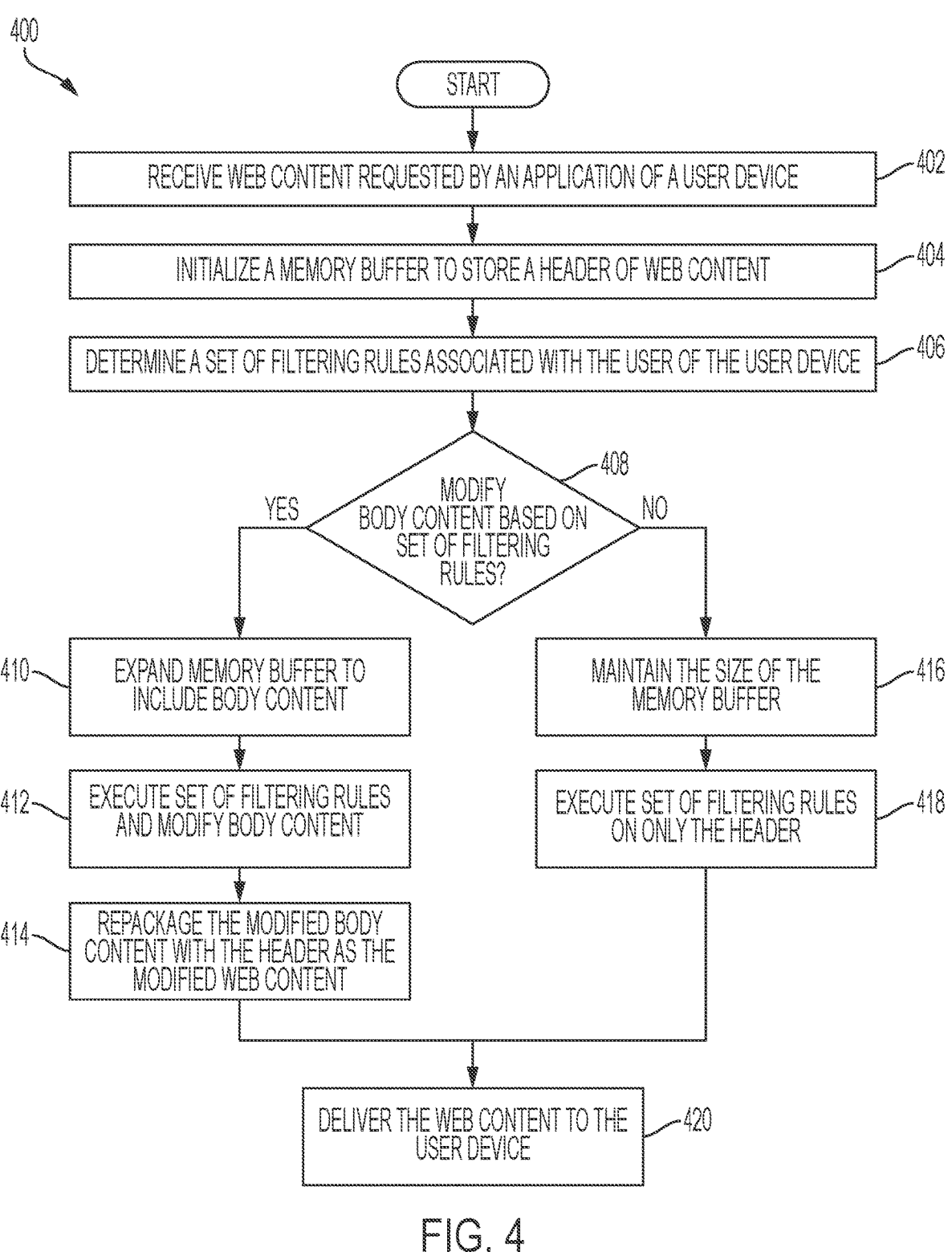

400

START

RECEIVE WEB CONTENT REQUESTED BY AN APPLICATION OF A USER DEVICE — 402

INITIALIZE A MEMORY BUFFER TO STORE A HEADER OF WEB CONTENT — 404

DETERMINE A SET OF FILTERING RULES ASSOCIATED WITH THE USER OF THE USER DEVICE — 406

MODIFY BODY CONTENT BASED ON SET OF FILTERING RULES? — 408

YES

NO

EXPAND MEMORY BUFFER TO INCLUDE BODY CONTENT — 410

EXECUTE SET OF FILTERING RULES AND MODIFY BODY CONTENT — 412

REPACKAGE THE MODIFIED BODY CONTENT WITH THE HEADER AS THE MODIFIED WEB CONTENT — 414

MAINTAIN THE SIZE OF THE MEMORY BUFFER — 416

EXECUTE SET OF FILTERING RULES ON ONLY THE HEADER — 418

DELIVER THE WEB CONTENT TO THE USER DEVICE — 420

START

EXPAND THE MEMORY BUFFER ⟋502

STORE BODY CONTENT IN THE EXPANDED MEMORY BUFFER ⟋504

MODIFY THE BODY CONTENT BASED ON THE SET OF FILTERING RULES ⟋506

REPACKAGE THE MODIFIED BODY CONTENT WITH THE HEADER AS THE MODIFIED WEB CONTENT ⟋508

PROXY SERVER WITH DYNAMIC MEMORY BUFFER

FIELD OF THE DISCLOSURE

The instant disclosure relates to web filtering. More specifically, portions of this disclosure relate to modification of requested web content by a proxy.

BACKGROUND

A proxy server may act as an intermediary between a user device and a network, filtering web content requested from one or more web servers by the user device, allowing approved web content to pass from the web server to the user device, and blocking unapproved content from being delivered to the user device. However, a proxy server may be unable to filter or alter web content at the user device. Furthermore, a proxy server may not have access to information regarding a user's interaction with the web content once it is delivered to the user device.

Proxy servers may provide web filtering functions to check a website being requested by a user of a device to determine if the user is permitted to access the requested website. Web filtering may be performed to prohibit access to illegal or inappropriate content based on user age. For example, in a school system, web filtering may be used to prevent student access to websites that do not include appropriate educational content.

The proxy server receives requests from users, retrieves web pages at the request of a user, and forwards the retrieved web pages to the user. The proxy server may apply web filtering and ignore some requests that are deemed unallowed. However, additional functionality may be desired.

SUMMARY

A proxy server may initialize a memory buffer to store a header of requested web content from a web browser of a user device. The proxy server may determine a set of filtering rules associated with the user based on whether the user is authenticated. When the user is authenticated, the proxy server may retrieve a set of rules that is specific to that user. Otherwise, the proxy server may use a default set of filtering rules. The proxy server may use the set of filtering rules to modify the requested web content by expanding a memory buffer of the proxy server to include body content of the requested web content, performing necessary modifications, and repackaging the newly modified body content to be delivered to the web browser of the user device.

Selectively expanding memory buffer size for individual web requests based on a filtering policy may improve the efficiency of the proxy server in handling web requests from clients. Increasing the number of users a proxy server may serve may reduce the latency with which those users are served through this selective memory buffer size expansion. In some embodiments, the filtering policy may be based on the identified users, such that web requests from certain users trigger the expanded buffer size and filtering of the body content of the web requests. The filtering in the expanded memory buffer may filter the content of the payload in a manner that is transparent and in-transit based upon the policy and, optionally, additional custom rules/logic, wherein the resulting web request arrives at the client device already modified such as without injected scripts, and the proxy server maintains low latency and efficiency.

This process of low-latency proxy-based filtering may be performed without an injection of code to the body content, which may allow public access to the logic executed on the page document object model (DOM) and create a gap between when the content is loaded in the user device's web browser and when it can execute on the user device's browser to filter appropriately. The lack of code injection may also avoid potential vulnerabilities in ways to bypass the injection or stop the code from running. A proxy server according to embodiments of this disclosure may leverage a system that allows executing script within the proxy server, allowing the proxy server to execute the same functions and modifications on the DOM directly to the payload while it is in transit. Injection of code relating to filtering may be avoided because the filtering logic was already performed and the web content already modified. The user device may have no record of this modification taking place and no ability for the user to access or stop the scripts that were utilized to filter the web content.

Shortcomings of filtering by code injection mentioned here are only representative and are included to highlight problems that the inventors have identified with respect to existing proxy servers and sought to improve upon. Aspects of the invention described below may address some or all of the shortcomings as well as others known in the art. Aspects of the improved invention described below may present other benefits than, and be used in other applications than, those described above. Further, aspects of the invention may improve upon code injection operations while also executing code injection.

According to one embodiment, a method may include receiving, by a proxy, web content requested by an application of a user device; initializing, by the proxy, a memory buffer of a first size to store a header of the web content; determining, by the proxy, a set of filtering rules associated with the user of the user device; determining, by the proxy, modified web content in accordance with the set of filtering rules, wherein the determining comprises, when the filtering rules specify modification of body content of the web content, performing operations comprising: expanding the memory buffer to a second size larger than the first size; storing the body content in the memory buffer; modifying the body content based, at least in part, on the set of filtering rules to form modified body content; and repackaging the modified body content with the header as the modified web content; and delivering, by the proxy, the modified web content to the user device.

In certain embodiments, the method may include determining, by the proxy, a set of filtering rules associated with the user of the user device based, at least in part, on whether the user is authenticated, and comprises at least one of: retrieving, by the proxy, a set of filtering rules that is specific to the user when the user is authenticated; or utilizing, by the proxy, a default set of filtering rules when the user is not authenticated.

In certain embodiments, the method may further include modifying, by the proxy, the body content of the web content based, at least in part, on the set of filtering rules comprises at least one of: removing, by the proxy, illegal content; or removing, by the proxy, blacklisted content.

According to another embodiment, the determining of the modified body content in accordance with the set of filtering rules comprises: when the set of filtering rules does not specify modification of the body content: maintaining the first size of the memory buffer; and executing the set of filtering rules on only the header stored in the memory buffer.

In some embodiments, the method may further include expanding the memory buffer of the proxy to include the body content of the web content, which comprises selectively expanding the memory buffer.

The method may be embedded in a computer-readable medium as computer program code comprising instructions that cause a processor to perform operations corresponding to the steps of the method. In some embodiments, the processor may be part of an apparatus including a first network adaptor configured to transmit data over a first network connection; and a processor coupled to the first network adaptor, and the memory. The apparatus may be configured to perform operations in embodiments of the methods described herein, such as by having the processor execute instructions contained on the computer-readable medium.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 4 is a flowchart illustrating a method of web filtering according to some embodiments of the disclosure.

DETAILED DESCRIPTION

Aspects of the disclosure include apparatuses, configurations, and/or methods for improving web filtering by selectively expanding the memory buffer to allow a self-contained proxying process. In one embodiment, the filtering logic may be executed on the body content of web requests included in an expanded memory buffer of the proxy server. In some embodiments, modifying the body content of requested web content does not include injecting a script.

Figure 1:
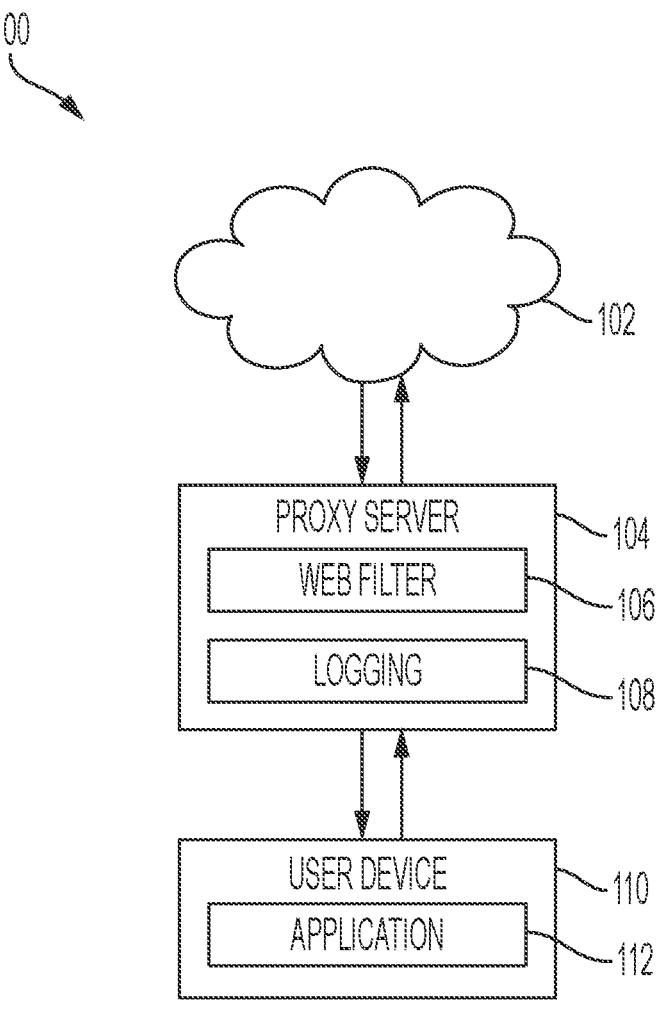
FIG. 1 is a block diagram of a web filtering system according to some embodiments of the disclosure.

FIG. 1 illustrates a block diagram of a web filtering system according to some embodiments of the disclosure. Referring to FIG. 1, a proxy server 104 may act as an intermediary between a network 102 and user device 110 with one or more web browsers or applications 112. The proxy server 104 may include a web filter 106 for filtering web content received by the proxy server 104. The web filter 106 may compare web content requested by an application 112 of user device 110 with a list of sources to determine if the user device 110 should be allowed to access the requested web content. In one example, the list of sources may be a whitelist of permitted network addresses. In another embodiment, the list of sources may be a blacklist of prohibited network addresses. The proxy server 104 may include a logging engine 108, which may record events, such as network requests made to the proxy server 104, sources of web content, such as network addresses of web server hosts, requested by the user device 110, requested content blocked by the web filter 106, and/or requests for content allowed by the web filter 106. Although a single user device 110 and a single proxy server 104 are showed in the example configuration of FIG. 1, any number of proxy servers may act as intermediaries between a network and any number of user devices.

The user device 110 may be any type of device including mobile phones, tablets, laptop computers, desktop computers, thin clients, servers, and other Internet-connected devices such as smart televisions, for example. The web browser or application 112 can be executed by the user device 110 for viewing and interacting with web content, such as text, video, audio, or other web content. In an embodiment, the application 112 may transmit a request for web content to the proxy server 104. The web filter 106 may determine whether or not to transmit the request to a web server of the network 102. Alternatively, the proxy server 104 may automatically transmit the request to the network 102 and the web filter 106 may make the determination of whether the application 112 is allowed to access the content after the requested web content is received from the network 102 by the proxy server 104. The logging engine 108 of the proxy server may log the request from the application 112 and may log whether or not the application 112 was allowed by the web filter 106 to access the web content.

Figure 2:
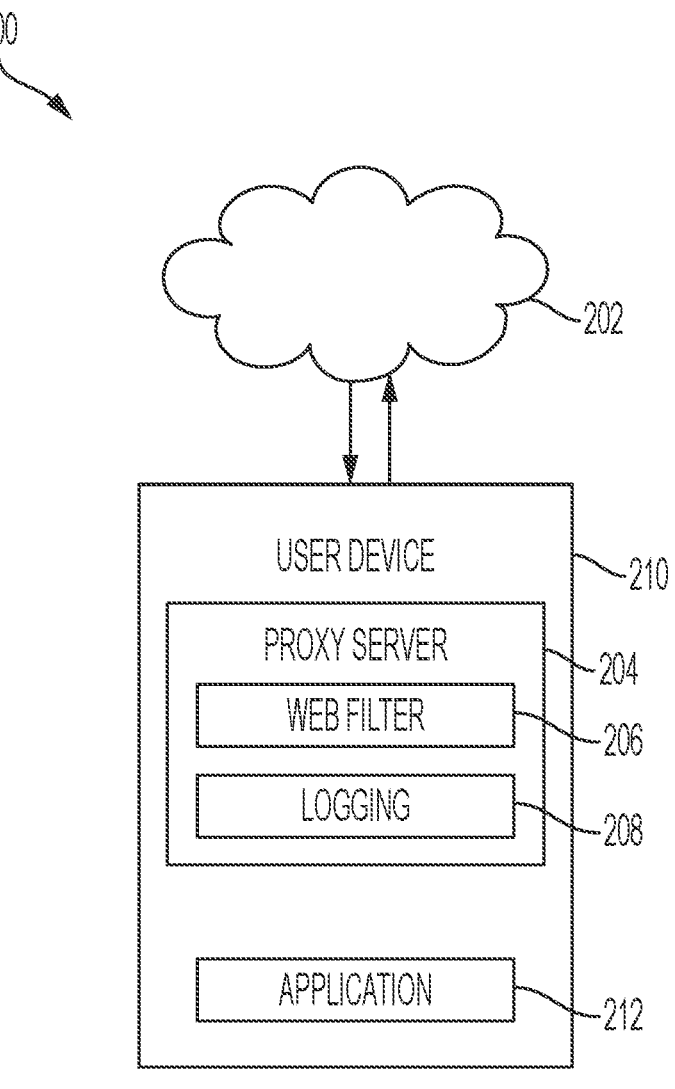
FIG. 2 is a block diagram of a web filtering system using user device-level proxies according to some embodiments of the disclosure.

Referring to FIG. 2, some user devices may execute a proxy server application that acts as an intermediary between a network and a web browser or application of the user device. The user device 210 may execute a proxy server application 204 that may function similarly to proxy server 104, as illustrated in FIG. 1, except, instead of being a discrete server, the proxy server 204 may be an application executed on the user device 210. Similar to the proxy server 104 of FIG. 1, the proxy server application 204 may include a web filter 206 and a logging engine 208. The web filter 206 of the proxy server application 204 may filter content requested from the network 202 by the application 212, as described with respect to the web filter 106 of FIG. 1. The logging engine 208 may log and report activity of the proxy server application 204 and activity information received from the web browser or application 212, as described with respect to the logging engine 108 of FIG. 1.

The proxy server configurations off or on a user device of the embodiments of FIG. 1 or FIG. 2, respectively, may be configured to execute aspects of this disclosure relating to dynamic memory configuration, content filtering, and other aspects of the methods described herein. Dynamic memory buffer control is illustrated and described with reference to FIGS. 3A and 3B.

Figure 3A:
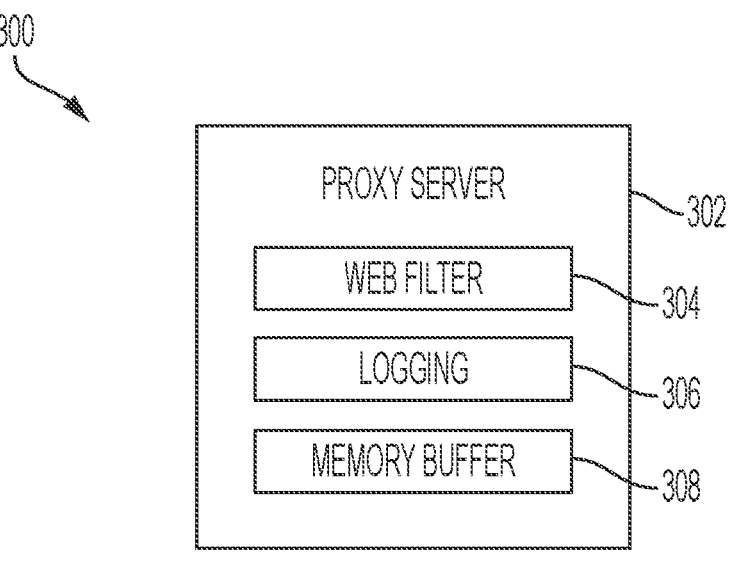
FIG. 3A is a block diagram of a proxy server with a memory buffer of an original size to store a header of web content.
Figure 3B:
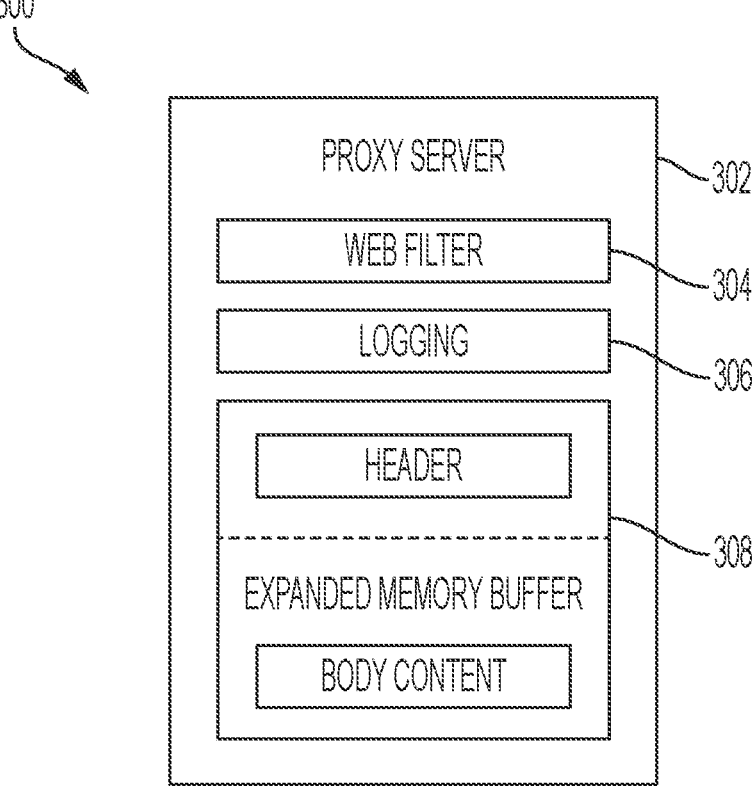
FIG. 3B is a block diagram of a proxy server with an expanded memory buffer to further store body content of the web content.

FIGS. 3A and 3B are block diagrams illustrating the memory buffer of a proxy server before and after determining that the body content of the requested web content requires modification. The memory buffer is part of the application layer of the proxy server. The network traffic arrives on the lower layer Transmission Control Protocol (TCP) socket and the web content request is read and passed through the application layer of the proxy server and its memory buffer. The TCP layer may always contain all of the data and not go through any selective process, but may be Secure Sockets Layer (SSL) encrypted. Referring to FIG. 3A, the proxy server 302 may include a web filter 304 for filtering web content received by the proxy server 302 and a logging engine 306 for recording events, as described with respect to the web filter 106 and logging engine 108 of FIG. 1. The memory buffer 308 is initialized with a first size by the proxy server 302 for storing a header of requested web content. The first size may be a fixed size or a dynamic size, but in either case is limited to a size that stores less than the entire requested web content, such as a size corresponding to an expected header or a portion of the header. Referring to FIG. 3B, the expanded memory buffer 308 of a second size larger than the first size stores the body content of the requested web content. The second size may be a fixed size or a dynamic size, and may be at least larger than the size of the header or portion of the header (corresponding to the first size) or at least as large as the requested web content or a portion of the requested web content. This expansion may be done selectively based, at least in part, on the hostname, URL, and/or policies or rules associated with the user.

FIG. 4 is a flowchart illustrating a method of web filtering according to some embodiments of the disclosure. Method 400 may be performed, for example, by a processor executing code retrieved from a memory or a non-transitory computer readable medium of a computer program product. At block 402, the proxy server receives web content requested by a web browser or application of a user device. In some embodiments, the web content may be compressed or encrypted, in which case the proxy server may decompress and/or decrypt the web content. The proxy server may allow a man-in-the-middle ability to read the encrypted data and process the web content request. This may provide the proxy server with an opportunity to include the content in the memory buffer and make necessary modifications before being delivered to the user device. For example, a web content request may be generated by user action such as selection of an option on a website to navigate to, entering of a web address into the web browser, selection of a bookmark from a list of bookmarks, or any other user-generated instruction to access web content. Alternatively, the web request may be an auxiliary web request automatically generated by the web browser, such as an advertisement refresh, a request for additional assets, an embedded request, such as a JavaScript request, for additional web content, or another request automatically generated by the web browser.

At block 404, the proxy server initializes a memory buffer of a specific size to store a header of the web content. The proxy server then determines a set of filtering rules associated with the user of the user device at block 406 based, at least in part, on whether the user is authenticated. The filtering rules may be user-specific, organization-specific, or a default set. The organization-specific filtering rules may be applicable to a workplace or school according to some embodiments.

At block 408, the proxy server determines whether to modify body content based on the determined set of filtering rules. At block 416, when the body content will not be modified, the proxy server maintains the size of the memory buffer initialized at block 404. The modification may be made, for example, through analysis of content by list of known words that represent illegal activity and/or inappropriate subjects, through analysis of content by scripts of executable program logic, or through analysis of custom rules or logic. At block 418, the proxy server executes the set of filtering rules on only the header stored in the originally-sized memory buffer. The modification may be executed while the web content is in transit to the user device. At block 420, the web content is delivered to the user device. The user device may have no record of this modification taking place and no ability for the user to access or stop the scripts that were utilized to filter the web content.

The buffer may be part of the application layer of the proxy. The network traffic may be received on a lower-layer TCP socket, and that request may then be passed through the application layer of the proxy and the memory buffer. The TCP layer may contains all of the data and does is not selectively processed, but may be secure sockets layer (SSL)

encrypted. The proxy service may allow a man in the middle (MITM) type ability to read the encrypted data and process the request, providing an opportunity to inject data into the application memory buffer before being transmitted through to the request origin application (e.g., browser, application, etc.). As an example, requested data may be received via the network layer, processed by the proxy layer, which modifies the requested data, and then passes the requested data to the requesting application (e.g., browser, etc.). One example of requested data may be: "[Website][Cookies][Body] In this example, here are the illustrative sizes for each part of the request: 1[Google.com]-1kb2[Cookies: X,Y]-2kb3[Body: <html><head></head><body></body></html>]-863 kb". When the requested data is received and processed by the proxy process, for many websites the proxy process only needs portion "1" for filtering. In fewer circumstances, portion "2" may be used for filtering. When page content should be modified, the proxy service may dynamically expand the memory buffer and store portion "3" in the buffer (e.g., application memory), and subsequently repack the portions together before sending to the requesting application.

At block 410, when the body content is determined to not be modified, the proxy server selectively expands the memory buffer to include content, including the body content of the requested web content. The proxy server executes the set of filtering rules and modifies the body content at block 412. At block 414, the modified body content is repackaged with the header as the modified web content. At block 420, the modified web content is delivered to the user device.

Figure 5:
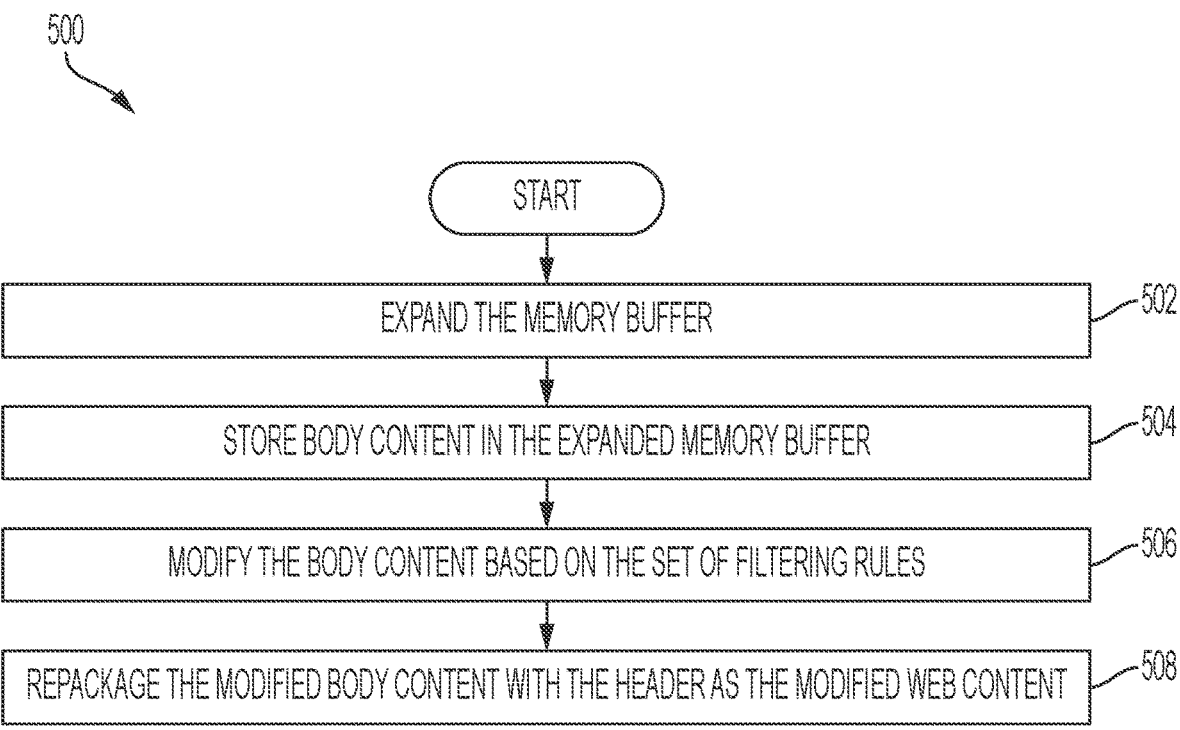
FIG. 5 is a flowchart illustrating a method of modifying body content by a proxy server according to some embodiments of the disclosure.

FIG. 5 is a flowchart illustrating a method of modifying body content by a proxy server according to some embodiments of the disclosure. Upon determining that the set of filtering rules specifies modification of the body content, the proxy server performs method 500. At block 502, the proxy server expands the memory buffer to include information beyond headers. This new buffer size may be controlled selectively based, at least in part, upon the hostname, URL, and/or the policies/rules associated with the user making the request through the proxy. The body content is stored in the expanded memory buffer at block 504.

At block 506, the body content is modified based on the set of filtering rules. The self-contained proxying process may avoid use of the Internet Content Adaptation Protocol (ICAP) layer or other services that require the payload to be transported multiple times. This process can import functions that can be read and executed by the proxy on web traffic in-flight, allowing for dynamic modification of requested web content before it reaches the one or more user devices. Injection adds a script tag which executes the functions locally on the user device, but is not needed in this process. The transparency of the improved proxying means any logic and updates/removals can be done before the user device has received the payload. This may improve the experience for the user by removing delays in execution or script errors. This process may also improve security by enabling non-embedded code to be executed on the requested web content. The improved filter protection may ensure the removal of unallowed content before the payload is delivered to the device. The filtering rules may include functions for sanitizing video, image, or text content of the web content. At block 508, the modified body content is repackaged with the header as the modified web content to be delivered to the user device.

Figure 6:
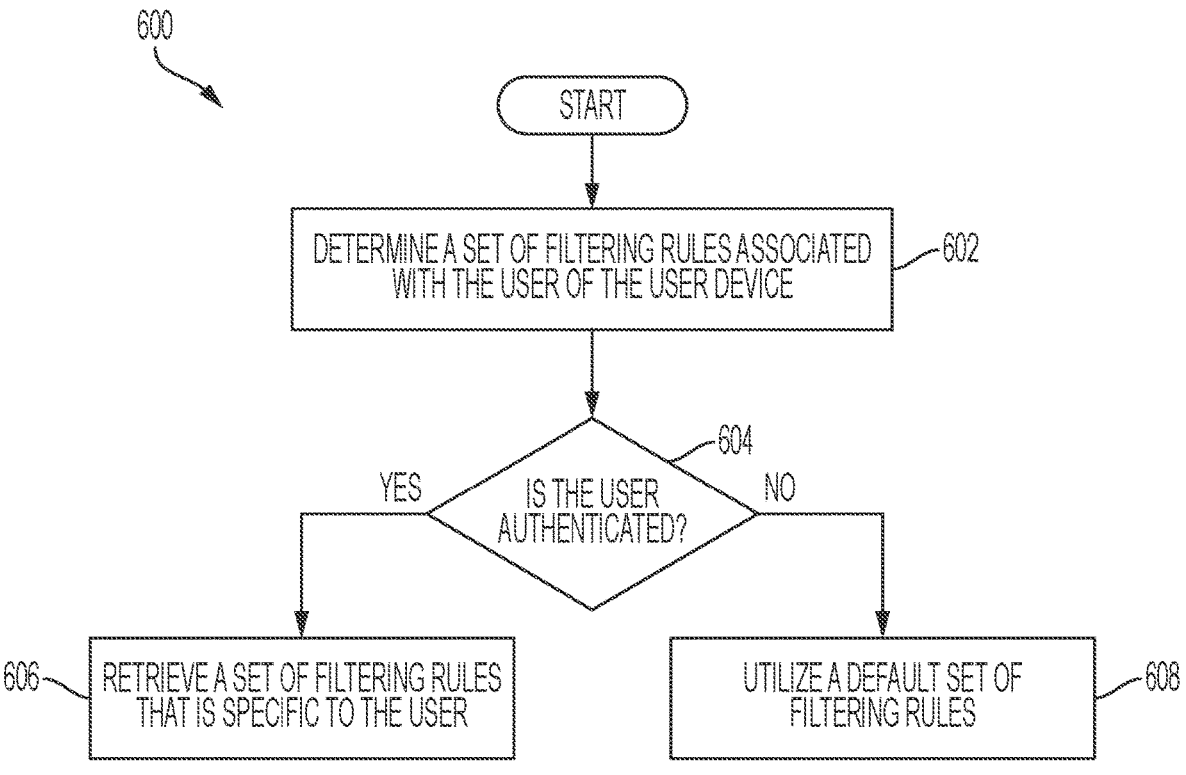
FIG. 6 is a flowchart illustrating a method of determining a set of filtering rules to be used by the proxy server based on the user of the user device.

FIG. 6 is a flowchart diagram illustrating a method of determining a set of filtering rules based on whether the user is authenticated according to certain embodiments. At block 602, the proxy server determines the set of filtering rules associated with the user device. At block 604, the proxy determines whether the user is authenticated.

When the user is authenticated, the proxy server proceeds to retrieve a set of filtering rules that is specific to the user at block 606. The set of filtering rules may be used to block content that may be considered distracting, inappropriate, etc. When the user is not authenticated, the proxy server may utilize a default set of filtering rules at block 608.

Based on either the user-specific filtering rules or the default filtering rules, the proxy server may modify the body content of the web content based on the set of filtering rules. The web filter of the proxy may compare web content requested by the web browser of the user device with a list of sources to determine if the user device should be allowed to access the requested web content. The list of sources may be a whitelist of permitted network addresses or, in another embodiment, a blacklist of prohibited network addresses, for example. The filtering may be done using keyword or content filters. Blacklisted content may be illegal content, or content that may be deemed as inappropriate, distracting, or otherwise seen as undesirable. In an example embodiment, a student may be accessing an educational video using their filtered device. The filtering policy may block comments, a sidebar with featured or recommended videos, and/or advertisements. The payload may be delivered to the student's device with the distracting elements already removed from the modified body content.

The schematic flow chart diagram of FIGS. 4, 5, and 6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by a proxy, web content requested by an application for a user;
   initializing, by the proxy, a memory buffer of a first size to store a header of the web content;
   determining, by the proxy, a set of filtering rules associated with the user;
   determining, by the proxy, modified web content in accordance with the set of filtering rules, wherein the determining comprises, when the filtering rules specify modification of body content of the web content, performing operations comprising:
      expanding the memory buffer to a second size larger than the first size based on at least one of a hostname and a URL, wherein the expanding comprises increasing the buffer size based on the body content and based on expected modifications to the body content;
      storing the body content in the memory buffer;
      modifying the body content based, at least in part, on the set of filtering rules to form modified body content; and
      repackaging the modified body content with the header as the modified web content; and
   delivering, by the proxy, the modified web content to the application.

2. The method of claim 1, wherein determining, by the proxy, a set of filtering rules associated with the user is based, at least in part, on whether the user is authenticated, and comprises at least one of:
   retrieving, by the proxy, a set of filtering rules that is specific to the user when the user is authenticated; or
   utilizing, by the proxy, a default set of filtering rules when the user is not authenticated.

3. The method of claim 1, wherein modifying, by the proxy, the body content of the web content based, at least in part, on the set of filtering rules comprises at least one of:
   removing, by the proxy, illegal content;
   removing, by the proxy, one or more elements including at least one or more comments, sidebars, or advertisements; or
   removing, by the proxy, blacklisted content.

4. The method of claim 1, wherein determining the modified body content in accordance with the set of filtering rules comprises:
   when the set of filtering rules does not specify modification of the body content:
      maintaining the first size of the memory buffer; and
      executing the set of filtering rules on only the header stored in the memory buffer.

5. The method of claim 1, wherein determining the modified body content does not include injecting a script.

6. An apparatus, comprising:
   a memory storing processor-readable code;
   at least one processor coupled to the memory, the at least one processor configured to execute the processor-readable code to cause the at least one processor to perform operations include:
      receiving, by a proxy, web content requested by an application for a user;
      initializing, by the proxy, a memory buffer of a first size to store a header of the web content;
      determining, by the proxy, a set of filtering rules associated with the user;
      determining, by the proxy, modified web content in accordance with the set of filtering rules, wherein the determining comprises, when the filtering rules specify modification of body content of the web content, performing operations comprising:
         expanding the memory buffer to a second size larger than the first size based on at least one of a hostname and a URL, wherein the expanding comprises increasing the buffer size based on the body content and based on expected modifications to the body content;
         storing the body content in the memory buffer;
         modifying the body content based, at least in part, on the set of filtering rules to form modified body content; and
         repackaging the modified body content with the header as the modified web content; and
      delivering, by the proxy, the modified web content to the application.

7. The apparatus of claim 6, wherein determining, by the proxy, a set of filtering rules associated with the user is based, at least in part, on whether the user is authenticated, and comprises at least one of:
   retrieving, by the proxy, a set of filtering rules that is specific to the user when the user is authenticated; or
   utilizing, by the proxy, a default set of filtering rules when the user is not authenticated.

8. The apparatus of claim 6, wherein modifying, by the proxy, the body content of the web content based, at least in part, on the set of filtering rules comprises at least one of:
   removing, by the proxy, illegal content;
   removing, by the proxy, one or more elements including at least one or more comments, sidebars, or advertisements; or
   removing, by the proxy, blacklisted content.

9. The apparatus of claim 6 wherein determining the modified body content in accordance with the set of filtering rules comprises:

when the set of filtering rules does not specify modification of the body content:

maintaining the first size of the memory buffer; and executing the set of filtering rules on only the header stored in the memory buffer.

10. The apparatus of claim 6, wherein determining the modified body content does not include injecting a script.

11. The apparatus of claim 6, wherein the at least one processor executes the application and the proxy.

12. A computer program product, comprising:

a non-transitory computer readable medium storing instructions that, when executed by a processor, cause the processor to perform operations comprising:

receiving, by a proxy, web content requested by an application for a user;

initializing, by the proxy, a memory buffer of a first size to store a header of the web content;

determining, by the proxy, a set of filtering rules associated with the user;

determining, by the proxy, modified web content in accordance with the set of filtering rules, wherein the determining comprises, when the filtering rules specify modification of body content of the web content, performing operations comprising:

expanding the memory buffer to a second size larger than the first size based on at least one of a hostname, and a URL, wherein the expanding comprises increasing the buffer size based on the body content and based on expected modifications to the body content;

storing the body content in the memory buffer;

modifying the body content based, at least in part, on the set of filtering rules to form modified body content; and repackaging the modified body content with the header as the modified web content; and delivering, by the proxy, the modified web content to the application.

13. The computer program product of claim 12, wherein determining, by the proxy, a set of filtering rules associated with the user is based, at least in part, on whether the user is authenticated, and comprises at least one of:

retrieving, by the proxy, a set of filtering rules that is specific to the user when the user is authenticated; or utilizing, by the proxy, a default set of filtering rules when the user is not authenticated.

14. The computer program product of claim 12, wherein modifying, by the proxy, the body content of the web content based, at least in part, on the set of filtering rules comprises at least one of:

removing, by the proxy, illegal content;

removing, by the proxy, one or more elements including at least one or more comments, sidebars, or advertisements; or removing, by the proxy, blacklisted content.

15. The computer program product of claim 12, wherein determining the modified body content in accordance with the set of filtering rules comprises:

when the set of filtering rules does not specify modification of the body content:

maintaining the first size of the memory buffer; and executing the set of filtering rules on only the header stored in the memory buffer.

16. The computer program product of claim 12, wherein determining the modified body content does not include injecting a script.

17. The computer program product of claim 12, wherein the instructions further cause the at least one processor to execute the application for the user.

* * * * *